United States Patent
Eggington et al.

[11] 3,888,330
[45] June 10, 1975

[54] MEANS AND METHOD OF CONTROLLING FLUID CUSHION VEHICLES

[75] Inventors: Wilfred J. Eggington, Claremont; Owen Douglas, Fair Oaks, both of Calif.

[73] Assignee: Aerjet-General Corporation, El Monte, Calif.

[22] Filed: Feb. 21, 1973

[21] Appl. No.: 334,791

Related U.S. Application Data

[63] Continuation of Ser. No. 63,487, Aug. 13, 1970, abandoned.

[52] U.S. Cl. ............ 180/121; 114/67 A; 180/117
[51] Int. Cl. .................................................. B60v 1/16
[58] Field of Search .......... 180/116, 117, 118, 120, 180/121; 114/66.5 R, 67 R, 67 A; 244/23 R

[56] References Cited
UNITED STATES PATENTS

| | | | |
|---|---|---|---|
| 3,050,146 | 8/1962 | Crim | 180/117 |
| 3,150,731 | 9/1964 | Franklin et al. | 180/118 |
| 3,384,197 | 5/1968 | Bingham et al. | 180/117 |
| 3,467,213 | 9/1969 | Walker | 180/120 |
| 3,605,938 | 9/1971 | Davis et al. | 180/120 |

FOREIGN PATENTS OR APPLICATIONS

| | | | |
|---|---|---|---|
| 1,075,745 | 7/1967 | United Kingdom | 180/118 |

*Primary Examiner*—M. Henson Wood, Jr.
*Assistant Examiner*—Randolph A. Reese
*Attorney, Agent, or Firm*—Edward O. Ansell

[57] ABSTRACT

A fluid cushion vehicle of the type having a number of cushion cells arranged beneath it around a periphery thereof which by the force of fluid such as compressed air sent into them provides lift enabling the vehicle to hover above water or other surface or terrain, is provided with means for releasing fluid to the atmosphere from a central cushion area beneath the vehicle bounded by the peripheral cells, thereby controlling the hover height of the vehicle. Releasing fluid from or introducing fluid into the central cushion controls the height, and reduction of hover height by release of fluid can improve stability. By directing fluid release from the central cushion in desired lateral directions, directional impulses can be given to the vehicle.

12 Claims, 17 Drawing Figures

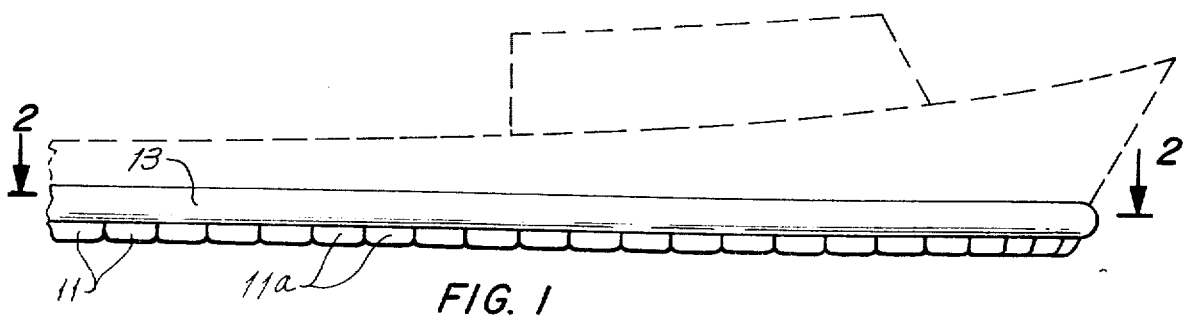
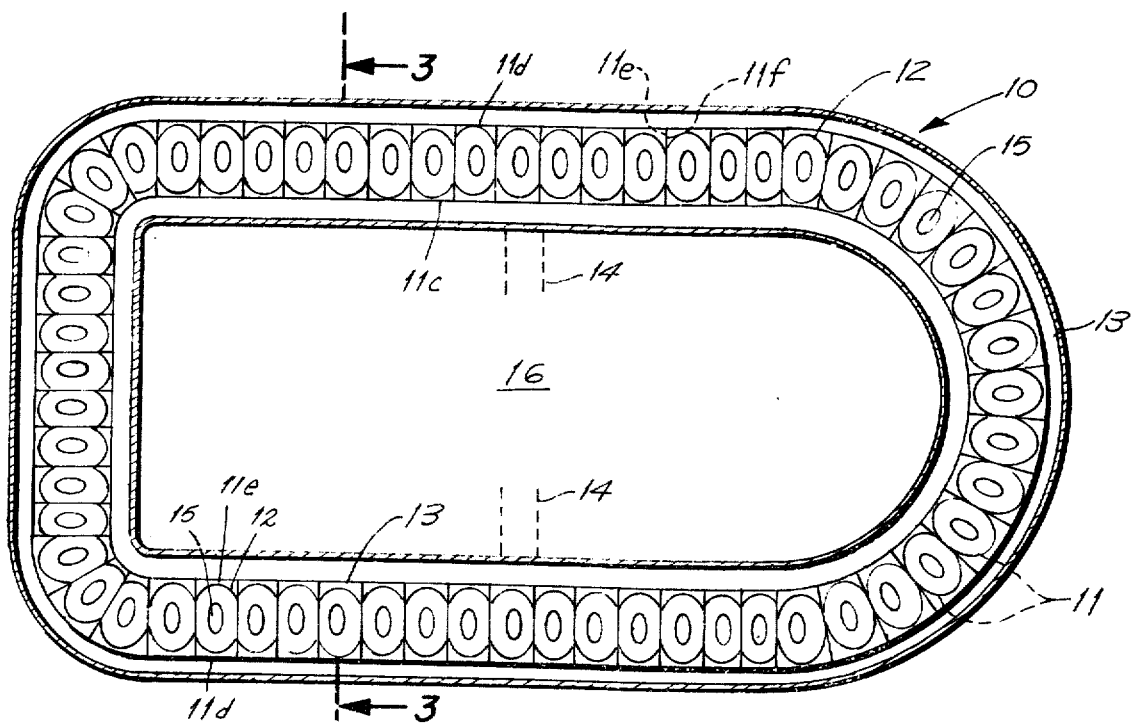
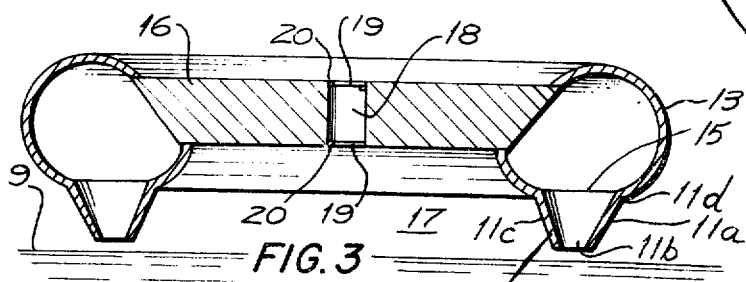
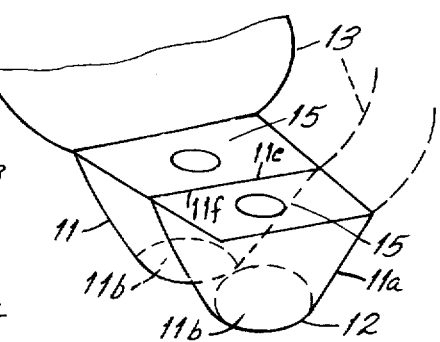
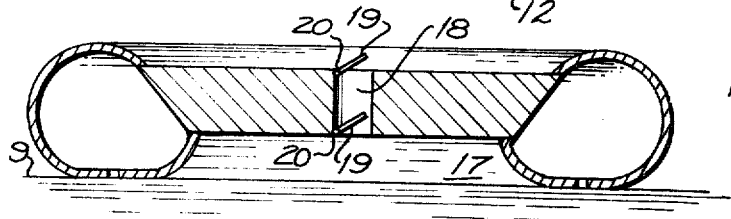
WILFRED J. EGGINGTON
OWEN DOUGLAS
INVENTORS
BY D. Gordon Angus
ATTORNEY

WILFRED J. EGGINGTON
OWEN DOUGLAS
INVENTORS

BY
D. Gordon Angus
ATTORNEY

MEANS AND METHOD OF CONTROLLING FLUID CUSHION VEHICLES

This is a continuation of application Ser. No. 63,487 filed Aug. 13, 1970 now abandoned.

This invention relates to fluid cushion vehicles and has for an object to improve the stability of such vehicles. The invention herein described was made in the course of a contract with the Department of the Navy.

Fluid cushion vehicles, commonly comprise a vehicle body or frame having cells which provide a cushion of pressurized fluid, such as air, between the vehicle and the surface over which it travels, for the purpose of providing lift for the vehicle. The pressurized fluid is ordinarily provided by a fluid compression means, usually an air compressor, which sends the pressurized fluid such as air into the cells located at the bottom of the vehicle such that the pressure of the fluid from beneath the cells provides sufficient lift for the vehicle to raise it above the surface or terrain over which the vehicle is hovering or moving, such that the fluid, ordinarily air, escapes from beneath the vehicle through the space between the bottoms of the cells and the surface, created by the lift. Such vehicles are ordinarily capable of hovering above water, ice or other terrain or surface and are commonly provided with suitable drive mechanisms such as fluid jets or propellers to propel the vehicle in a desired direction.

In a common form of fluid cushion vehicle or craft fluid cells are arranged in a peripheral manner around the bottom of the vehicle or craft with each cell closely adjacent to the next. When their skirts are distended by the introduced fluid, there is provided a central fluid cushion in the region beneath the vehicle bounded by the cells.

Such vehicles usually have a normal operating height above the water or terrain or surface over which they travel. It is known that when it has been attempted to reduce the height of an air cushion vehicle or craft below the normal height, for example, by reducing the flow of fluid such as air into the cells, the craft tends to become less stable in that heave, pitch and roll can increase. The term heave refers to vertical motion of the craft; the term pitch refers to angular motion in a vertical plane, that is, bow up with stern down followed by stern up with bow down; and the term roll refers to angular motion in a vertical plane, that is oscillation about the longitudinal center line of the craft, the sides of the craft moving up and down.

Under normal hovering conditions the bottoms of the cushion cell skirts are spaced somewhat above the surface or terrain, allowing escape of fluid from beneath the cells to the atmosphere. It is sometimes desirable to operate the craft at partial depth or height, for example for low speed operation or careful maneuvering or movement in confined areas and for braking, and the like. It is known that the height of the vehicle can be reduced below normal height by reducing the fluid pressure supplied to the cells, which ordinarily causes the vehicle to come all the way down to its lower-most position at the terrain or surface; and an intermediate condition of partial hover height cannot readily be maintained merely by reduction of fluid pressure in the cells.

In accordance with the present invention the vehicle can be operated at partial hover heights and the stability of the vehicle or craft is improved, enabling it to operate without undue pitch, heave or roll even when operating at only partial depth and substantially below normal height.

The invention is carried out by releasing the fluid, normally air, from the central cushion to the atmosphere. A feature resides in a controlled release of this fluid from the central cushion, which can be carried out by a controlled opening or valve means. Outflow of fluid or air in this manner reduces the craft's hover height bringing the cushion cell skirts into contact with the terrain, until sufficient support is obtained directly from the pressurized air in the cells to take a greater proportion of the weight of the vehicle. Inasmuch as the skirts of the cells ordinarily taper toward each other downwardly, the support that the cells give to the craft increases with reduction in hover height, since the area of the cell skirts in contact with the terrain increases. Thus, the air cushion vehicle may attain any desired hover height by adjusting the opening or valve preferably, but not necessarily, accompanied by adjustment of the flow of the fluid such as air to the cells, providing stability in heave. Because of the significant pressure differential between pressure of the fluid or air in the cells and that in the central cushion (the pressure in the cells being higher), when air is flowing from the central cushion to the atmosphere, the taper of the cells also insures both roll and pitch stability at partial hover height.

By use of this invention the hover height can be controlled by the rate of fluid release from the central cushion and without the necessity for altering the fluid flow into the cells; although, if desired, the fluid flow into the cells may be altered or reduced while fluid is being released from the central cushion to the atmosphere.

An optional feature resides in controlling the direction of the fluid or air released to the atmosphere from the central cushion, providing desirable directional effect to the vehicle.

Another optional feature resides in the provision of openings through the inner sides of cells into the central cushion area.

The foregoing and other features of the invention will be better understood from the following detailed description and the accompanying drawing of which:

FIG. 1 is a side elevation if an air cushion vehicle according to this invention;

FIG. 2 is a plan view taken at line 2—2 of FIG. 1;

FIG. 2a is a fragmentary perspective of a pair of adjacent peripheral cells, showing their relationship to each other and the inflatable duct;

FIG. 3 is a cross-section view taken at line 3—3 of FIG. 2, showing a fluid control valve closed;

FIG. 3a is a cross-section view similar to that of FIG. 3 excepting that the fluid control valve is shown open;

Figure 4:
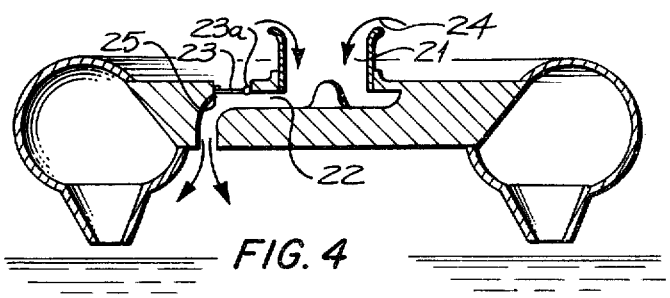
FIG. 4 is a cross-section view showing a modification of fluid release valve means which may be used according to this invention.

Referring to the drawings, FIGS. 1, 2 2a and 3 show an air cushion vehicle designed for use over water, land, ice or other surface or terrain. The term terrain as used herein means any surface, either water, ice or land over which the vehicle may hover. The vehicle comprises a frame 10 which supports an inflatable duct 13, known as a bag, of flexible material extending peripherally around the vehicle. A number of cushion cells 11 are attached to, and depend from, the bag or duct 13 around the periphery beneath the underside of the bag, the upper ends of the cells being in communication with the duct through an opening 15. The duct is somewhat tubular in shape although it will generally not be exactly circular in cross-section. Rather, it will be shaped to be fitted to the frame and cells. The cells are in the general form of cavities or chambers formed by walls or skirts 11a ordinarily of flexible material, located beneath the vehicle and provided with openings 11b at the bottoms 12 of the skirts. The inner and outer walls 11c and 11d respectively of the cell skirts taper or converge toward each other toward the bottom and the adjacent walls 11e and 11f of adjacent skirts lie in contact with each other.

Means are provided for sending pressurized fluid, ordinarily compressed air, into the duct so that it flows into each cell from the duct. The compressed air will ordinarily be supplied to the duct 13 from ducting 14 mounted to the frame leading from a suitable air compressor (not shown). Due to the proximity of the cells to the terrain over which the vehicle travels, ordinarily water in the present case, fluid pressure builds up in the cells and in the central cushion region 17 bounded by the cells. This pressure distends the cells and extends their skirts and urges the skirts against each other, and the pressure acting upwardly against the bottom of the vehicle raises it somewhat off the terrain or water so that fluid escapes from between the bottoms of the cells and the terrain.

The central region bounded by the bag or duct 13 is covered by a partition 16 attached to the frame so that there is a central space between the partition 16 and the terrain or water bounded by the peripheral cells, into which air escaping from the bottoms of the cells pressurizes the air in this central space, causing it to act as the central cushion 17 contributing lift to the vehicle.

Figure 4A:
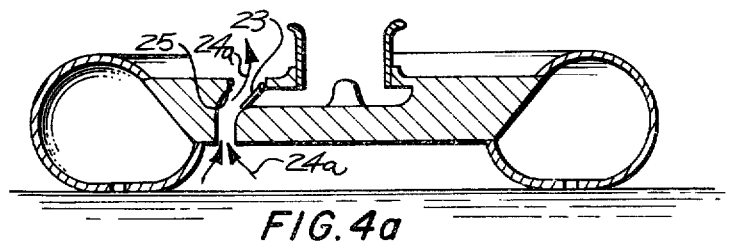
FIG. 4a is a view similar to that of FIG. 4 except that the fluid release valve is shown in a different position.

According to a feature of this invention means are provided for releasing air at a desired rate from the central cushion. This comprises an opening 18 (FIGS. 3 and 3a) through partition 16, closeable by valves in the form of gates 19 hinged on pivots 20, which may be opened to any desired degree as shown in FIG. 3a. When the gates are closed the craft is in its normal hover position above the terrain 9 as shown in FIG. 3. Opening of the gates, as shown in FIG. 3a, allows escape of air upwardly from the central cushion through the partition to the atmosphere, reducing the air pressure in the cushion and causing the seals, the combination of the bag 13 and the cells 11, to take more of the support of the vehicle. The craft's hover height is thus reduced until sufficient support is obtained from the seals alone to take the vehicle's weight, as shown in FIG. 3a. Due to the taper of the cells the support that they give to the craft as they constrict increases with reduction in hover height as the skirt bottoms fold up when moving down and dragging on a solid terrain surface. Thus the vehicle may attain any desired hover height between normal height and minimum height by adjusting the valve opening to control the amount of fluid released. Because of the significantly lower pressure of the air in the central cushion as compared with that in the cells, when air is flowing from the central cushion to the atmosphere, the taper of the cells also insures both roll and pitch stability at any partial hover height. When releasing air from the central cushion in this manner it will usually be desirable also to reduce the flow of air from the air compressor into the bag 13 supplying the cells. In addition to providing for release of air from the central cushion, it may sometimes be desirable to supply air direct to the cushion, as shown in FIG. 4. For this purpose a duct 21 from the compressed air supply connects with a passageway 22 leading into the central cushion so that when flap valve 23 hinged on pivot 23a at a wall of passageway 22 closes an opening 25 in the wall, compressed air will flow into the central cushion as shown by the arrows 24 in FIG. 4. This will supply greater lift for the craft than that obtainable from the peripheral cells alone, when desired. When it is desired to reduce the hover height the compressed air 24 can be shut off by pivoting valve 23 to the position shown in FIG. 4a, which closes passageway 22 and at the same time opens the opening 25 so that air is now released from the central cushion as shown by arrows 24a.

Figure 5:
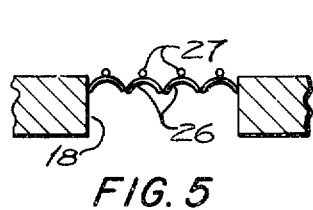
FIG. 5 is a cross-section view showing another form of fluid release valve mechanism which may be used according to this invention.
Figure 5A:
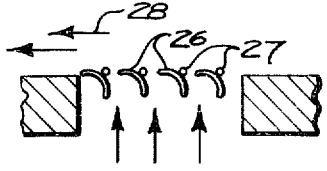
FIG. 5a is a cross-section view of the detail of FIG. 5 excepting that the valve mechanism is shown giving direction effect to one side.
Figure 5B:
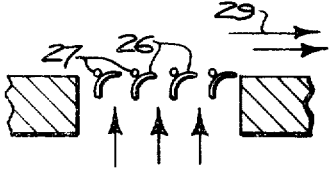
FIG. 5b is a cross-section view of the detail shown in FIG. 5a excepting that the valve mechanism is shown giving directional effect to the opposite side.

FIG. 5 shows a valve mechanism which may be used as an alternative to valve 19 for closing the opening 18 similar to the same numbered opening of FIG. 3. The valve arrangement of FIG. 5 comprises a number of louvers 26 extending across the opening 18 and mounted individually on individual hinges on pivot rods 27 also extending across the opening. The pivot rods are rotatable in supports at their opposite ends and arranged to be rotated in unison, for example at a suitable pinion on the individual rods (not shown). By this arrangement, the opening 18 can be closed by contacting the edges of adjacent louvers as in FIG. 5; or the rods can be rotated in one direction to open the louvers by leaving space between the edges of adjacent louvers in an array shown in FIG. 5a wherein the air released from the central cushion is diverted toward the left side with reference to this figure as shown by arrows 28; or alternatively, to the opposite side as shown by arrows 29 in FIG. 5b. Such an arrangement can be used to urge the craft sideways by reaction of the air escaping in the lateral direction.

Figure 6:
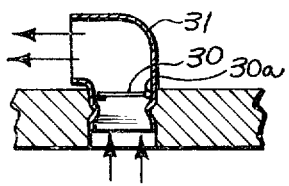
FIG. 6 is a cross-section view of another optional detail showing means associated with the fluid release valve for giving directional effect to one side.
Figure 6A:
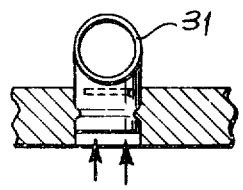
FIG. 6a is a cross-section view of a detail similar to that of FIG. 6 except that the directional effect is being given at 90° to that shown in FIG. 6.

FIG. 6 shows an alternative arrangement for giving directional effect wherein the opening 18 provided with a suitable form of valve such as, for example, the depending valve 30 pivoted at 30a, similar to valve 23 of FIG. 4, has fitted to it a nozzle 31 in the form of an elbow which can be rotated through 360° so that it can give directional effect sideways as shown in FIG. 6 or by turning the nozzle 90°, either in a fore or aft direction as shown in FIG. 6a.

Figure 7:
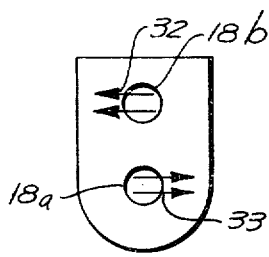
FIG. 7 is a plan view of a craft according to this invention showing two fluid release outlets from the central cushion, one arranged to give directional effect to one side and the other to the other side.
Figure 7A:
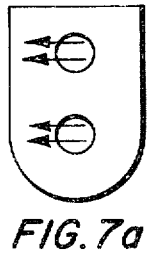
FIG. 7a is a plan view like that of FIG. 7 except that the directional effect from both fluid release outlets is given to the same side.
Figure 7B:
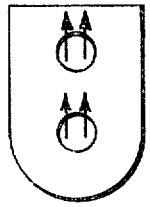
FIG. 7b shows the arrangement of FIG. 7 but with the directional effect arranged for forward propulsion.
Figure 7C:
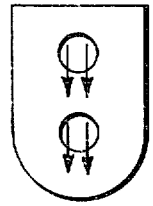
FIG. 7c is a view similar to that of FIG. 7 except that the directional effect is arranged for braking.

FIG. 7 illustrates a variation of means for giving directional effect to the craft. This comprises two openings 18a and 18b from the central cushion to the atmosphere, one opening being near the bow and the other near the stern of the craft. Each opening is provided with directional means which may be like that of FIG. 6. Thus, by giving the stern a directional effect to one side as shown by arrows 32 and by giving the bow the opposite directional effect as shown by arrows 33, the craft may be turned around sharply. By sending the directional effect to one side only from both openings, the craft may be moved sideways as shown in FIG. 7a; and by giving both openings the directional effect as shown in FIG. 7b the craft may be given a moderate propulsion effect forwardly; and by giving a braking effect if it is already underway. As is obvious from the foregoing disclosure and the drawings, the direction of fluid outflow may be controlled to provide thrust, directional moment, deceleration force or side force to improve the control of the vehicle at low speeds.

Figure 8:
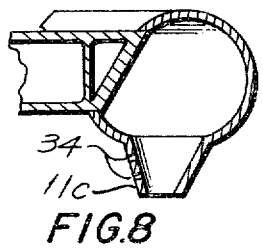
FIG. 8 is a detail view showing a modification of the skirt of an air cushion according to this invention.

FIG. 8 shows an optional modification which may be made in some or all of the cells. FIG. 8 shows one of the cells wherein the inner wall 11c is provided with openings 34 leading into the central cushion area. This will insure that more of the compressed fluid or air will enter the central cushion than will result without the openings. It will be understood that any number of such openings may be made in the skirt.

What is claimed is:

1. In a cushion cell vehicle adapted to travel or hover over terrain, said vehicle being of the type having a plurality of cushion cells, formed by downwardly distending skirts of flexible material which are open at the bottom, said cells being arranged around the periphery of the vehicle to form a central space bounded by the peripheral cells below the vehicle to provide a central fluid cushion, and wherein said cushion cells have in planform a lower edge and an upper edge which circumscribes a greater area than circumscribed by the lower edge, and having means for introducing pressurized fluid into the cells which leaves at their bottom openings to raise the pressure in the central cushion space as well as at the cells and exert lift to the vehicle, a system for operating at a selected partial hover height comprising means for controllably releasing fluid from the central cushion to the atmosphere to bring said pressurized peripheral cushion cells into constrictive contact with the terrain and the planform of said cushion cells lower edges become progressively larger as the cells become increasingly constricted, to the extent that the lift exerted by the constricted cushion cells is substantially equal to the vehicle weight, and said vehicle is stable in the rolling and pitching planes and in vertical translation while operating at said selected partial hover height.

2. A combination according to claim 1 in which the means for controllably releasing fluid from the central cushion to the atmosphere comprises adjustable valve means.

3. A combination according to claim 2 in which the valve means comprises means directing the released fluid in a desired direction.

4. Apparatus according to claim 1 in which hole means is provided in the inner side of a cell skirt to admit fluid into the central cushion space.

5. A combination according to claim 1, and in addition, means for directly supplying pressurized fluid to said central cushion space.

6. A combination according to claim 1 wherein said means for controllably releasing fluid from the central cushion to the atmosphere comprises curved louvers pivoted about axes lying in a horizontal plane so that upon movement of the curved louvers in one direction or the other the fluid is directed accordingly to provide thrust, directional movement, deceleration force or side force to enhance control of the vehicle at low speeds.

7. A combination according to claim 1 wherein said means for controllably releasing fluid from the central cushion to the atmosphere has a plurality of openings and is provided with adjustable directional means at each opening so that impulses can be provided separately in desired directions from each opening.

8. A cushion cell vehicle adapted to travel or hover over terrain, said vehicle having a plurality of adjacent cells having downwardly extending skirts open at the bottom, said cells being around the periphery of the vehicle leaving a central area below the craft bounded by the peripheral cells to provide a central air cushion, said cells having in planform a lower edge and an upper edge which circumscribes a greater area than circumscribed by the lower edge, means for introducing fluid into the cells so that the fluid leaves the cells at their bottom openings, thereby raising the pressure in the cushion area as well as at the cells and exerting lift for the vehicle to normal hover height, and controlled opening means from the central cushion to the atmosphere for controllably releasing air from the central cushion to the atmosphere to reduce the hover height of said vehicle to bring the lower edges of said peripheral cells in contact with the terrain, said controlled opening means including a nozzle at the opening means which can be turned in a desired direction to give directional impulse to the vehicle, whereby the pressure differential between the fluid in the peripheral cells and the fluid in the central cushion and the contact of the lower edges of said peripheral cells with the terrain provides said vehicle with stability in the rolling plane, pitching plane and in vertical translation while operating on a cushion of partial height.

9. In a cushion cell vehicle adapted to travel or hover over terrain, said vehicle being of the type having a plurality of cushion cells, formed by downwardly distending skirts of flexible material which are open at the bottom, arranged around the periphery of the vehicle to form a central space bounded by the peripheral cells below the vehicle to provide a central fluid cushion, said cushion cells having in planform a lower edge and an upper edge which circumscribes a greater area than circumscribed by the lower edge, and having means for introducing pressurized fluid into the cells which leaves at their bottom openings to raise the pressure in the central cushion space as well as at the cells and exert lift to the vehicle, a system for operating at a selected partial hover height comprising: means for selectively introducing fluid to the central cushion space to enhance lift to the vehicle, or controllably releasing fluid from the central cushion space to the atmosphere to bring said pressurized peripheral cushion cells into constrictive contact with the terrain, and the planform of each said cushion cell lower edge becomes progressively larger as the cells become increasingly constricted, to the extent that the lift exerted by the constricted cushion cells is substantially equal to the vehicle weight and said vehicle is stable in the rolling and pitching planes and in vertical translation while operating at said selected partial hover height.

10. A method of operating at a selected partial hover height a cushion cell vehicle adapted to travel or hover over terrain, said vehicle being of the type having a plurality of cushion cells formed by downwardly distending skirts of flexible material which are open at the bottom, said cells being arranged around the periphery of the vehicle in touching relationship to form a central space bounded by the peripheral cells below the vehicle, thereby providing a central fluid cushion, and wherein said cushion cells have in planform a lower edge and an upper edge which circumscribes a greater area than circumscribed by the lower edge and wherein the planform of said lower edge becomes progressively larger as the cells become increasingly constricted, comprising: introducing pressurized fluid into the cells which leave at their bottom openings to raise the pressure in the central cushion space as well as the cells and exert lift to the vehicle, and controllably releasing fluid from the central cushion to the atmosphere to bring said pressurized peripheral cushion cells into constrictive contact with the terrain to the extent that the lift exerted by the constricted cushion cells is substantially equal to the vehicle weight, and said vehicle is stable in the rolling and pitching planes and in vertical translation while operating at said selected partial hover height.

11. A method according to claim 10 wherein the pressurized fluid is introduced into the cushion cells at a lesser flow rate than during traveling.

12. A method according to claim 10 and, in addition, the step of directing the released fluid in a desired direction.

* * * * *